United States Patent
Ashani (10) Patent No.: US 9,524,558 B2
(45) Date of Patent: Dec. 20, 2016

(54) METHOD, SYSTEM AND SOFTWARE MODULE FOR FOREGROUND EXTRACTION

(71) Applicant: Agent Video Intelligence Ltd., Rosh HaAyin (IL)

(72) Inventor: Zvika Ashani, Ganey Tikva (IL)

(73) Assignee: Agent Video Intelligence Ltd., Rosh HaAyin (IL)

(*) Notice: Subject to any disclaimer, the term of this patent is extended or adjusted under 35 U.S.C. 154(b) by 0 days.

(21) Appl. No.: 14/768,930

(22) PCT Filed: Dec. 10, 2013

(86) PCT No.: PCT/IL2013/051020
§ 371 (c)(1),
(2) Date: Aug. 19, 2015

(87) PCT Pub. No.: WO2014/128688
PCT Pub. Date: Aug. 28, 2014

(65) Prior Publication Data
US 2016/0005182 A1    Jan. 7, 2016

(30) Foreign Application Priority Data
Feb. 25, 2013   (IL) .......................... 224896

(51) Int. Cl.
*G06K 9/46* (2006.01)
*G06T 7/00* (2006.01)
(Continued)

(52) U.S. Cl.
CPC .............. *G06T 7/0081* (2013.01); *G06K 9/46* (2013.01); *G06T 5/50* (2013.01); *G06T 7/403* (2013.01);
(Continued)

(58) Field of Classification Search
CPC ................... G06T 7/0081; G06T 2207/20144; G06T 7/0083; G06T 2207/10016; G06K 9/38; G03B 15/02; G03B 15/05; G03B 15/06; G03B 15/03; F21W 2131/406
See application file for complete search history.

(56) References Cited

U.S. PATENT DOCUMENTS 8,285,046 B2   10/2012   Cobb et al.

OTHER PUBLICATIONS

Quming Zhou et al: "Tracking and Classifying Moving Object from Video", Second IEEE International Workshop on Performance evaluation on Tracking and Surveillance, Dec. 9, 2001, pp. 1-8, Kauai, Hawaii, USA.

(Continued)

*Primary Examiner* — Duy M Dang
(74) *Attorney, Agent, or Firm* — Arent Fox LLP; Michael Fainberg (57) ABSTRACT

A method is provided, suitable for use in extraction of foreground objects from image stream. The method comprises: providing input image data of a region of interest, providing background model of said region of interest, and utilizing said background model for processing each image of the input image data. The processing comprises: determining a background gradient map for pixels in said background model and an image gradient map for pixels in the image; defining a predetermined number of one or more segments in said image and corresponding one or more segments in the background model; determining, for each image segment, an edge density factor is a first relation between the image and background gradient maps for said segment; and calculating foreground detection threshold based on said certain relation, thereby enabling use of said foreground detection threshold for classifying each pixel in the segment as being a foreground or background pixel.

14 Claims, 8 Drawing Sheets

(51) Int. Cl.
 *G06T 7/40* (2006.01)
 *G06T 5/50* (2006.01)
(52) U.S. Cl.
 CPC ............... *G06T 2207/10016* (2013.01); *G06T 2207/20104* (2013.01); *G06T 2207/20144* (2013.01); *G06T 2207/20224* (2013.01); *G06T 2207/30232* (2013.01)

(56) References Cited

OTHER PUBLICATIONS

Son Lam Phung et al: "A new image feature for fast detection of people in images", International Journal of Information and System Sciences, 2007, pp. 383-392.
International Search Report for PCT/IL2013/051020, Mar. 20, 2014.

METHOD, SYSTEM AND SOFTWARE MODULE FOR FOREGROUND EXTRACTION

TECHNOLOGICAL FIELD

The present invention is generally in the field of image processing techniques and relates to a system and method for processing an image stream, which is particularly useful for computerized vision and automated video surveillance.

BACKGROUND

Foreground extraction is one of the basic building blocks of computerized vision and automatic video surveillance systems. Generally, most object detection techniques are based, at their early stages, on identifying which of the image's pixels are associated with the background and which pixels are to be further processed as being associated with foreground objects.

Typical techniques for foreground extraction from an image or image stream are based on background subtraction. To this end, a background model is typically utilized; the model is then subtracted from a currently processed frame/image to identify differences between the model and the image. More specifically, the background model is subtracted from the frame being processed, and for each pixel the so-determined difference is analyzed with respect to a specific threshold. For example, if the subtracted pixel value exceeds the threshold, the pixel is considered as foreground, otherwise the pixel is assumed as background related.

For example, U.S. Pat. No. 8,285,046 describes techniques for a computer vision engine to update both a background model and thresholds used to classify pixels as depicting scene foreground or background in response to detecting that a sudden illumination changes has occurred in a sequence of video frames. The threshold values may be used to specify how much a given pixel may differ from corresponding values in the background model before being classified as depicting foreground. When a sudden illumination change is detected, the values for pixels affected by sudden illumination change may be used to update the value in the background image to reflect the value for that pixel following the sudden illumination change as well as update the threshold for classifying that pixel as depicting foreground/background in subsequent frames of video.

GENERAL DESCRIPTION

The present invention provides a novel technique for identifying and extracting pixels and/or regions of an image associated with foreground objects over regions/pixels of the image associated with a background. The technique of the invention may be implemented as a software product, installable (e.g. by downloading from the Internet) in a storage utility of a computer device or any other computer readable media.

Generally, the technique of the present invention deals with subtraction of a background model from the image data of a currently processed frame/image. In other words, the invention concerns the novel thresholding technique for background extraction or determination of a foreground detection threshold. For each pixel of an image being processed, a difference between the pixel value and that of the corresponding pixel in the background model (previously defined/received) is calculated. The calculated difference is then compared to a threshold determined in accordance with the technique of the invention. If the difference exceeds the threshold, the pixel is considered as associated with a foreground object. According to the invention, the threshold, generally termed herein "foreground detection threshold", is determined for different blocks/segments of the image in accordance with a calculated probability that the segment may contain foreground objects. The foreground detection threshold may thus be the same or different for different blocks/segments of the same image, e.g. it may be spatially different within the image, as well as may dynamically change from frame to frame.

Thus, the present invention provides an accurate threshold determination for different segments of the image/frame. To this end, the calculated threshold is based on a comparison of image gradients between the image and the corresponding background model. Any segment of the image or the background model that contains significant variation in the gradient(s) is assumed to have a higher probability of containing foreground objects. If a certain segment of the image displays a relatively low difference in gradients from the background model, it is assumed to have a lower probability of containing foreground objects.

Thus, the present invention provides a novel technique for the extraction of foreground objects, or identifying pixels associated with such objects in an image. The technique involves: providing image data and an associated background model, processing said image data to identify image segments having higher probability of containing foreground objects by calculating a gradient map of the background model and the image data, and determining a relationship between the gradient maps in different segments of the image, and using this relationship to determine a corresponding foreground detection threshold for the specific image segment. Then, the threshold is applied to each pixel in the respective image segment to identify pixels associated with foreground objects, and the same is performed for each image segment.

In some embodiments of the invention, the foreground extraction technique also considers variations in illumination intensity of the region of interest to adjust the foreground detection threshold. Since thermal and electronic noise often cause variations in values measured by any imager/camera, and such noise/variations are typically greater when the pixel value is larger, the foreground detection threshold is higher for brighter segments of the frame and lower for darker segments thereof.

Thus, according to one broad aspect of the present invention, there is provided a method for use in extraction of foreground objects in an image stream. The method comprising: providing input image data of a region of interest; providing a background model of said region of interest; and utilizing said background model and processing each image in said input image data. Said processing comprising: determining a background gradient map for pixels in said background model and an image gradient map for pixels in the image; defining a predetermined number of one or more segments in said image and corresponding one or more segments in the background model; for each image segment, determining an edge density factor being a first relation between the image and background gradient maps for said segment, and calculating a foreground detection threshold based on said certain relation, thereby enabling use of said foreground detection threshold for classifying each pixel in the segment as being a foreground or background pixel. According to some embodiments of the invention, determining said edge density factor comprises estimating a relative probability that said segment includes foreground objects.

According to some embodiment of the present invention, the method comprises determining a second relation between values of the image pixels and values of corresponding pixels of said background model, using the corresponding foreground detection threshold to classify the pixels in said image segment as foreground or background related pixels in each image segment, such that if a second relation between values of said pixels is higher than said foreground detection threshold, the pixel is classified as being associated with a foreground object.

Calculating of said foreground detection threshold may comprise determining an illumination intensity factor being indicative of illumination intensity of said region of interest, said foreground detection threshold being determined in accordance with said intensity factor and the edge density factor. Additionally determining of said illumination intensity factor may comprise determining said illumination intensity factor in at least one segment of said of said region of interest.

According to some embodiments, said defining a predetermined number of one or more segments in said image may comprise receiving data indicative of pixel to meter ratios in said image data, determining one or more distance segments in said image data and defining said predetermined number of one or more segments such that pixels of said one or more segments correspond to one of said one or more distance segments. Additionally, according to some embodiments of the invention the background model may be updated in accordance with pixels of said image classified as associated with the background.

According to one other broad aspect the present invention provides a method for use in extracting foreground objects from an image stream, the method comprising: receiving data indicative of said image stream corresponding to a region of interest, said data indicative of said image stream comprising image data of one or more images; receiving a data about a background model of said region of interest; calculating edge maps of said background model and of image data of at least one image from said image stream; segmenting said region of interest to at least one segment and for each pixel in said at least one segment calculating a difference between edge map of said background model and of said image data to generate an edge difference map; and calculating a threshold map for use in detection of foreground pixels in said image data, the threshold map comprising foreground detection threshold values for said at least one segment of the region of interest based on said edge difference map.

According to some embodiments of the invention the method comprises calculating a difference between pixels of the background model and of said image data. If the difference in pixel values exceeds a corresponding foreground detection threshold of said threshold map the pixel is classified as associated with a foreground object.

According to one other broad aspect, the present invention provides a system for use in extraction of foreground objects in an image stream, the system comprising: data input utility for receiving input image data of a region of interest, and data comprising a corresponding background model of said region of interest; and a data processing and analyzing utility for utilizing said background model and processing each image in said input image data. The data processing and analyzing utility being configured and operable for carrying out the following: calculating a background gradient map for pixels in said background model and an image gradient map for pixels in the image; utilizing said background and image gradient maps and generating an edge relation map and calculating a foreground detection threshold for at least one segment of the region of interest in accordance with values of said relation map in said segment, calculating a relation between pixel values of the background model and of said image data in said at least one segment, and if said relation exceeds said foreground detection threshold classifying the corresponding pixel as associated with foreground of said image data and generating output data indicative of foreground related pixels in said image data.

The data processing and analyzing utility may comprise an illumination estimator utility configured and operable for determining an illumination intensity factor being indicative of illumination intensity of said region of interest. The data processing and analyzing utility may be configured and operable for utilizing said illumination intensity factor for calculating of said foreground detection threshold, said foreground detection threshold being determined in accordance with said intensity factor and the edge density factor. The illumination estimator utility may determine said illumination intensity factor in at least one segment of said of said region of interest.

According to some embodiments of the present invention, said data processing and analyzing utility may be configured and operable for receiving data indicative of pixel to meter ratios in said image data, determining one or more distance segments in said image data and defining a predetermined number of one or more segments such that pixels of said one or more segments correspond to one of said one or more distance segments. The data processing and analyzing utility may also be configured and operable for providing data indicative of pixels of said image classified as associated with the background for updating said background model in accordance with said data.

According to yet another broad aspect of the present invention, there is provided a software product for use in analyzing an image stream. The product comprising: a foreground extraction module configured and operable to receive input data comprising image data and a corresponding background model and to process said image data using said background model. The foreground extraction module comprises: an edge detection module configured to calculate a background gradient map for said background model and an image gradient map for said image data; a regional threshold calculation module configured to receive said background and image gradient maps and generate an edge relation map and calculate a foreground detection threshold for at least one segment of the region of interest in accordance with values of said relation map in said segment, for use in detection of foreground related pixels in said image data.

The software product may comprise a comparator module configured to calculate a relation between pixel values of the background model and of said image data in said at least one segment, and if said relation exceeds said foreground detection threshold classifying the corresponding pixel as associated with foreground of said image data. The foreground extraction module may comprise an illumination estimator module configured to determine an illumination intensity factor in accordance with illumination intensity of at least one of said background model and said image data, said regional threshold calculation module is configured to receive said background intensity factor and to adjust said foreground detection threshold accordingly.

According to some embodiments, the software product may comprise background updating module configured for receiving data about pixels of an image being associated with the background and for updating the background model.

Additionally, according to some embodiments, the foreground extraction module may be configured to receive data indicative of pixel to meter ratio in said image data. The regional threshold calculation module may be configured to receive said data indicative of pixel to meter ratios, determine accordingly one or more distance segments in said image data to thereby calculate said foreground detection threshold for said at least one segment of the region of interest in accordance with pixel to meter ratios is said one or more distance segments.

BRIEF DESCRIPTION OF THE DRAWINGS

To better understand the subject matter disclosed herein, and to exemplify how it may be carried out in practice, embodiments will now be described, by way of non-limiting example only, with reference to the accompanying drawings:

FIGS. 4A-4G exemplify foreground subtraction process utilizing the technique of the present invention.

DETAILED DESCRIPTION OF EMBODIMENTS

Various image processing techniques, in particular video processing techniques, rely on distinguishing between the foreground and background objects in an image. The present invention provides a novel and efficient technique for identifying pixels (or regions) in image data, which are associated with foreground objects over the background of the image. Such a technique would typically be implemented as a software module, configured to be executed by any image processing utility, specifically useful for processing video data.

Figure 1:
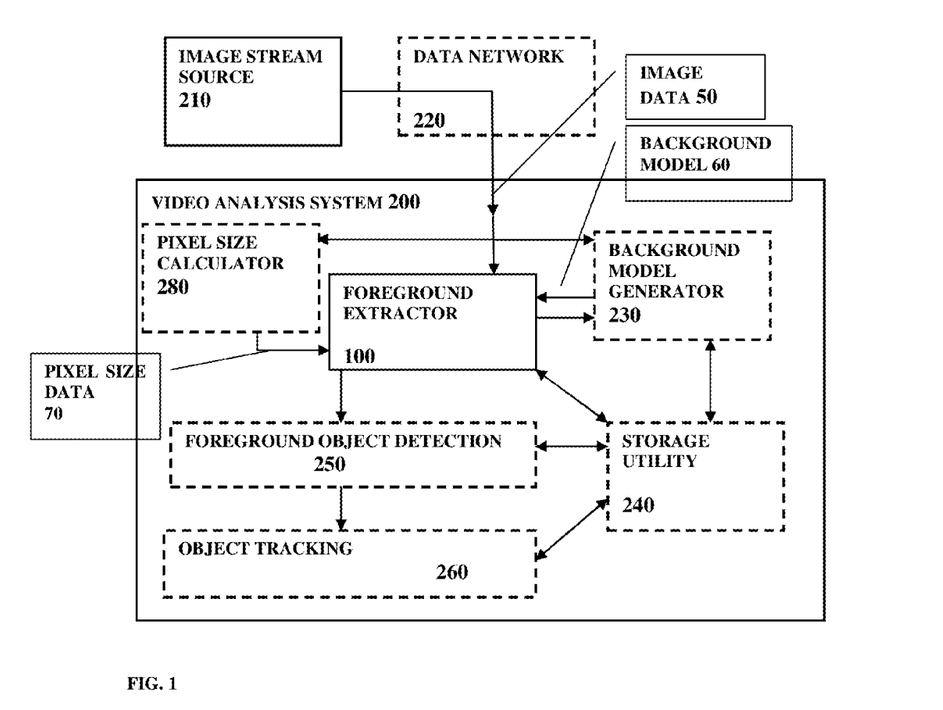
FIG. 1 illustrates schematically an image processing system suitable for utilizing the technique of the present invention.

FIG. 1 illustrates an image processing system 200 of the present invention, configured as a video analysis system. As shown, the system 200 is associated (capable of communicating with) with an image stream source 210, which may include one or more camera unit(s) and/or any other source configured to provide image data 50 (e.g. a storage unit containing images). The image data 50 may be transmitted to the video analysis system 200 directly and/or through any type of data network 220. The system 200 thus typically includes one or more dedicated input ports (not specifically shown). The image data 50 includes data of one or more images, preferably in some sequential order, of a region of interest.

The video analysis system 200 may typically be a computer system in the meaning that it is configured as a data processing utility which is preprogrammed to perform certain image processing, and possibly other data processing, and is connected to data input and output utilities (which are not specifically shown) and a memory utility (at least temporal memory) 240. Generally, the system 200 includes a foreground extractor (foreground extraction module) 100 which receives and processes data indicative of an input image to identify image data (pixels) 50 associated with foreground in said image, and distinguish between foreground related pixels and background related pixels. Additionally, the system 200 is associated with a background model generator 230 for defining a background model to be used in the extraction of foreground pixels from the image data 50. It should be understood that the background model generator 230 may be a module of the data processing utility 200 or may be installed in an external computer to which the data processing utility 200 is connectable (e.g. via a communication network). The system 200 may also include a pixel size calculator 280 configured to calculate a pixel to meter (P2M) ratio defining distance of various objects or regions of the frame from a camera.

The system 200 may be configured for the entire image processing and may thus include a foreground object detection module 250 and an object tracking module 260 configured and operable to identify, from the pixels associated with foreground of the image, foreground blobs and specific objects located in the region of interest. It should be noted that, generally, either one or both of the foreground object detection and object tracking modules may be installed in external computers/utilities connectable to the data processing utility 200.

Thus, generally, the data processing utility 200 includes at least the foreground extraction module 100 which is configured for receiving input image data 50 and background model data 60 and generating output data indicative of foreground associated pixels in the input image data. The foreground extraction module 100 is typically a software module configured for execution by a computer system to analyze input image data 50 utilizing a certain background model 60 to identify pixels in the image data associated with foreground elements/objects in the image data 50. This background model 60 is in turn determined based on the input image data. The principles of generation of the background model are generally known and do not form part of the invention, and therefore are not specifically described here.

As will be described more specifically further below, the foreground extraction module 100 operates to determine threshold value/values to be used to classify a predetermined relation between the difference pixel values in the image data 50 and corresponding pixels in the background model 60, for each pixel in the image, as corresponding to that of the foreground or background pixel.

It should be noted that pixels classified by the foreground extraction module 100 as foreground related pixels are not necessarily those of the foreground object itself. After the foreground extraction module 100 identifies such foreground related pixels in the image data 50, these pixels undergo further processing by the foreground object detection and tracking modules 250 and 260, which applies to said pixels processing algorithms including aggregation to blobs that correspond to objects, detection and identification of such blobs/objects and object tracking. Additionally, some foreground blobs, or isolated foreground pixels, might be neglected in the processing and detection of foreground objects for various reasons, such as being smaller than a blob's size threshold.

Figure 2:
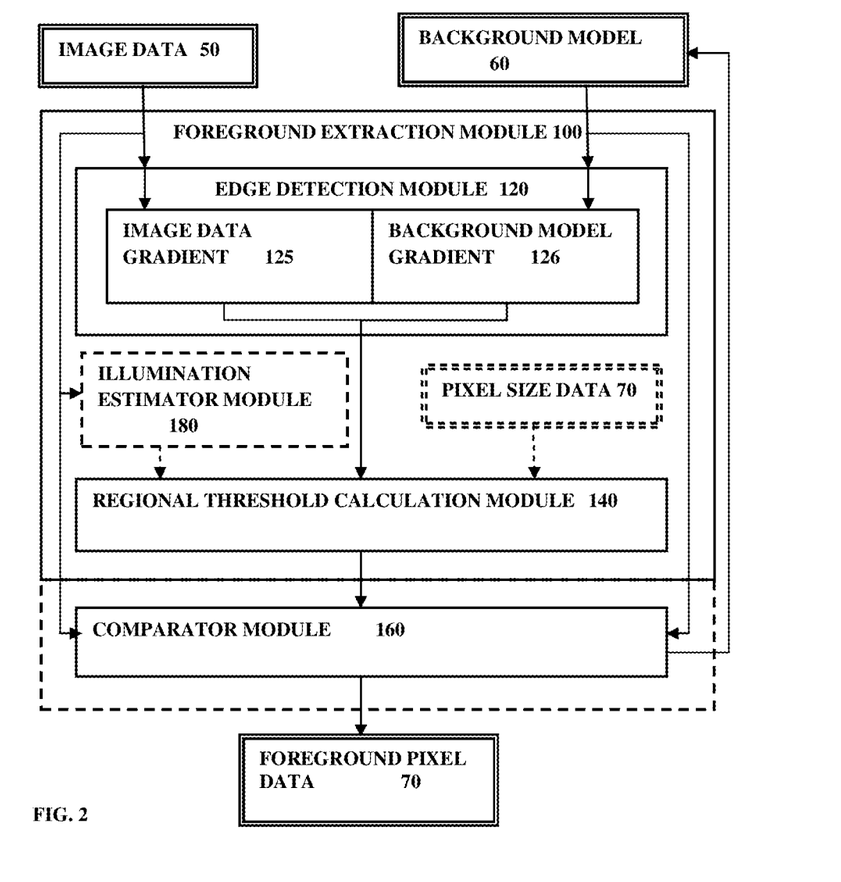
FIG. 2 illustrates schematically a foreground detection module according to the present invention.

FIG. 2 illustrates, by way of a block diagram, an example of the foreground extraction module 100 of the present invention. As noted, the foreground extraction module 100 is configured to receive image data 50 indicative of one or more images of a region of interest, and corresponding background model data 60, a certain model describing the background of said region of interest. The foreground extraction module 100 is configured for determining, for each image segment, its probability for including foreground data, and selecting an appropriate foreground detection threshold for the segment in accordance with the respective calculated probability, and then using the foreground detection threshold for identifying foreground related pixels in said image segment. More specifically, the foreground extraction module 100 includes an edge detection utility 120, a regional threshold calculation module 140, and a comparator module 160. The edge detection utility 120 is configured to calculate gradient maps, 125 and 126, of the input image data 50 and the background model 60 respectively. The regional threshold calculation module 140 is configured to utilize the gradient maps 125 and 126 to calculate appropriate foreground detection threshold values for various segments of the image of the region of interest. The comparator module 160 is configured to calculate a relationship between the image data pixels' values 50 and the corresponding pixels of the background model 60, and compare said relationship to the calculated foreground detection threshold.

In some embodiments, the foreground extraction module 100 may also include an illumination estimator module 180 (shown in dashed lines as its provision is optional) configured to determine one or more parameters associated with light intensity in the image data 50 and/or the background model 60. The light intensity parameters may then be utilized to fine tune the foreground detection threshold accordingly. Additionally, in some embodiments, the regional threshold calculation module 140 is configured to receive pixel size data 70, e.g. provided by the pixel size calculator shown in FIG. 1. The regional threshold calculation module 140 may be configured to utilize a pixel to meter ratios from the pixel size data 70 for selection of the foreground detection threshold as will be described in more details below.

As indicated above, various techniques for determining the background model are generally known in the art, and thus need not be described here in detail, except to note that the background model may typically be in the form of image data corresponding to image captured without any foreground objects in the scene. In addition, the background model may be updated over time, in accordance with determination of background regions during operation of the foreground extraction module, and in accordance with variations detected in the background, such as illumination variations, camera movement and/or movement of non-foreground objects.

As noted, the foreground extraction module 100 receives input data including data indicative of an image stream 50; and data of a current background model 60; and is operable to analyze this data to generate corresponding output data, including data on the existence of pixel(s) associated with foreground 70 in the image stream. The foreground extraction module 100 may also output data about the background which data may be used in a feedback loop (see FIG. 1) for updating the background model, which in turn is used for processing further images.

As mentioned above, the edge detection module 120 processes the input image data 50 and generates corresponding edge/gradient map 125 of the input image data. As for the gradient map 126 of the background model 60, it may generally be a part of background model data received by foreground extraction module 100. Typically, the edge detection module 120 is capable of generating such gradient map 126 as well. Typically, the edge detection module 120 may utilize any known technique for calculating the gradient map(s). The gradient maps 125 and 126 are then transmitted (by the edge detection module 120, or generally by the edge detection module 120 and the background generator) to the regional threshold calculation module 140 which uses these maps and calculates a foreground detection threshold, by comparing between the gradients of the two maps. The foreground detection threshold is determined in accordance with a relationship between the gradient maps, 125 and 126, such that if the gradient maps have significant differences in a segment of the image, the foreground detection threshold is selected to be of a relatively lower value to thereby provide more sensitive foreground detection; while in segments where the gradient maps are relatively similar, the threshold is selected to be of a relatively higher value allowing less sensitive foreground detection in those segments. It should be noted that the image segments may be of any size starting from a single-pixel segment up to the entire image; the selected foreground detection threshold may be the same or different for at least some segments of the image.

The calculated foreground detection threshold is then used to classify each pixel in the image (using the foreground detection threshold of the respective segment) as being the foreground pixel or background one. This is carried out by the comparator module 160, which may be a part of the foreground extractor, or may generally, as exemplified in the figure, be a separate module (e.g. in a separate computer) in communication with the foreground extractor 100. The comparator module 160 calculates a difference function between the pixel value in the image data 50 and in the background model 60, and analyzes this difference function with respect to the foreground detection threshold.

Such a difference function may for example be in the form:

$$D^i_j = f(|PC_i - PB_i|) \qquad \text{(equation 1)}$$

where $PC_i$ is the value of pixel i in the image data and $PB_i$ is the value of the corresponding pixel i in the background model, and $D^i_j$ is the difference function for pixel i in segment j of the image. For example, the technique of the present invention may utilized the difference function in the form $$D^i_j = |PC_i - PB_i| \qquad \text{equation 2)}$$

thus simplifying the calculations. It should be noted that for simplicity, the difference function of equation 2 is used herein below as a non-limiting example.

The comparator module 160 compares the relation (function) D of the difference to the calculated foreground detection threshold for the corresponding segment j: if the relation exceeds the threshold, pixel i is considered associated as foreground pixel (i.e. may represent a part of a foreground object).

As indicated, the foreground detection threshold is determined dynamically, for each image 50 and each background model 60, according to the corresponding gradient maps. The present invention's technique utilizes gradient maps of the processed image data, and the background model for comparing differences in segments of the frame/image, providing indications of segments having relatively high probability to contain foreground objects. More specifically, the regional threshold calculator module 140 analyzes the frame in the image data and decides about a number (and possibly a size) of segments therein, being any number from 1 (the entire frame) to the number of pixels in the image (e.g. single-pixel segment). Thus, in some embodiments, the regional threshold calculator module 140 performs segmentation of the frame in the image data to an array of blocks/segments; and for each segment calculates a relationship between the gradient maps, to thereby generate a relations' map (typically a binary or gray level map) for each pixel in each block.

The relationship between the gradient maps may be constituted by a difference between the maps. If the difference exceeds a certain (typically predetermined) second threshold, allowing some variations in the background maps (e.g. variations caused by noise), the corresponding pixels of the relation map are assigned with an edge value "1"; if the difference is lower than the second threshold, the corresponding pixels are assigned with an edge value "0". For each segment/block of the frame, the regional threshold calculator module 140 calculates the ratio between the number of such edge pixels (assigned value "1" or "0") in the segment and the entire number of pixels in said segment. This ratio defines an edge density factor which does not necessarily measure the density of edges but is rather utilized to simplify calculations of the foreground detection threshold. The edge density factor as a function of the number of edge pixels is exemplified in FIG. 3A for a 32 pixels' segment. The foreground detection threshold is in a predetermined relation (function) with the edge density factor, for example as illustrated in FIG. 3A the foreground detection threshold may be selected as the edge density factor or a linear function thereof, or in some embodiments as the edge density factor multiplied by an illumination factor as will be described below.

Figure 3A:
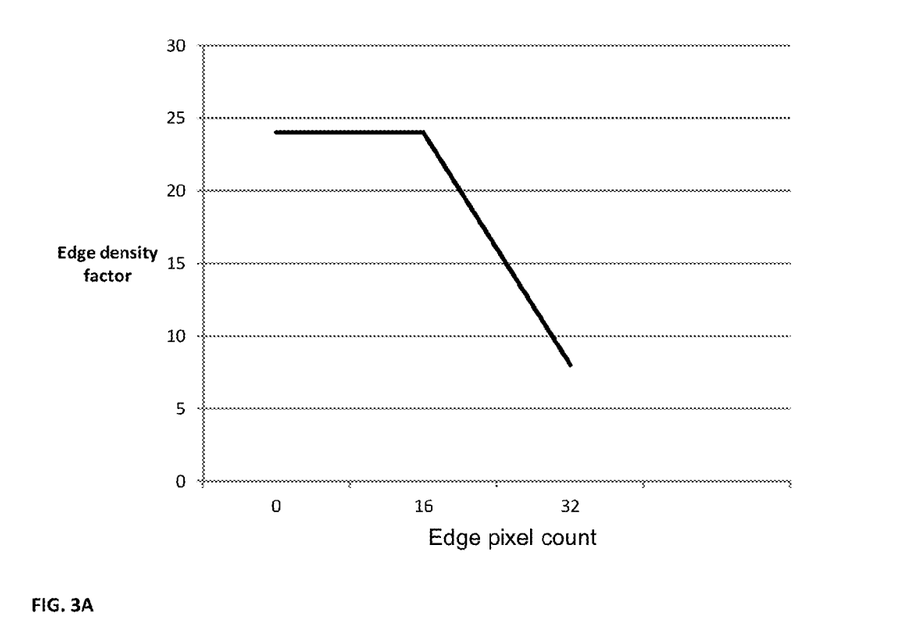
FIGS. 3A-3B respectively exemplify calculation of edge density Factor and illumination intensity factor for use in selection of the foreground detection threshold according to the present invention.

For example, as shown in FIG. 3A, the foreground detection threshold may be selected in accordance with the edge density factor and the corresponding segment's size. Generally, for a segment of the size N×M, where N is the number of pixels in a row and M is the number of pixels in a column, the edge density factor may vary linearly from maximal value ($EDF_{max}$) to minimal value ($EDF_{min}$) while the edge pixel count varies from minimal value of N×M/2 to maximal value of N×M, if the edge pixel count is lower than the minimal value the edge density factor remains in it maximal value, i.e. the edge density factor may follow the following equation (equation 3)
$$EDF = \begin{cases} EDF_{max}; & EPC < \frac{NM}{2} \\ \frac{2(EDF_{min} - EDF_{max})}{NM} EPC + 2EDF_{max} - EDF_{min}; & EPC > \frac{NM}{2} \end{cases}$$

where EDF is the edge density factor, $EDF_{max}$ and $EDF_{min}$ are the maximal and minimal acceptable values (e.g. $EDF_{min}=6$, $EDF_{max}=50$), N and M are the number of pixels in row/column and EPC is the edge pixel count. Typical values for $EDF_{max}$ may be between 20 to 50 and typical values for $EDF_{min}$ may be between 4 to 8. It should be noted that the values of $EDF_{min}$ and $EDF_{max}$ may vary in accordance with design of the system and intended use of the technique. It should also be noted that other functional dependency of the edge density factor may be used, which may or may not be linear with respect to the edge pixel count.

In some embodiments, the foreground detection threshold is selected from a list of possible threshold values corresponding to the calculated edge density factors for the edge pixel values, which may be stored in the storage unit (240 in FIG. 1), or received by the system 200 via a network connection.

Figure 3B:
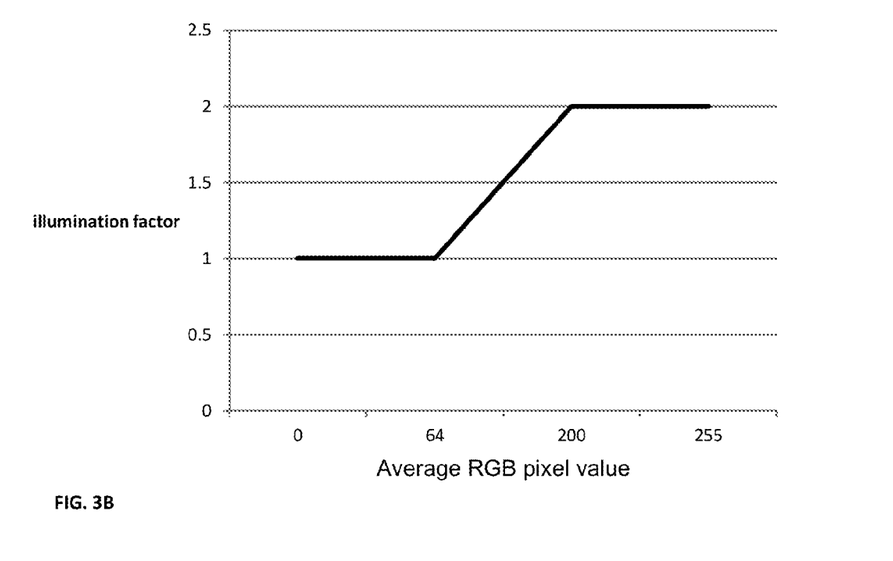

Turning back to FIG. 2, according to some embodiments, the present invention's technique also utilizes an intensity factor of the region of interest for appropriate selection of the foreground detection threshold. The intensity factor represents the average intensity of a frame segment calculated based on the image data and/or the background model, thus used to correct the foreground detection threshold to vary the sensitivity of foreground detection in accordance with illumination and noise amplitude of the processed segment. This technique enables efficient foreground detection in both bright and relatively dark regions of the frame. To this end, the foreground extraction module 100 includes an illumination estimator 180 configured to receive input data of the background model and/or the image data. In the specific but not limiting example of FIG. 2, the illumination estimator 180 receives the background model 50 only as the input data. The illumination estimator 180 is configured to process the received data to identify/estimate the illumination intensity factor of the received image/model, e.g. in accordance with the brightness parameter of the image. To this end, in general, pixel values corresponding to the primary colors, RGB, may be used, as well other pixel values (e.g. brightness or gray level for black-white (BW) imaging). The illumination factor for a certain segment depends on the average pixel values in the segment. This is exemplified in FIG. 3B. This is associated with the following: The pixel values include variations caused by noise associated with the scene itself and/or the camera sensor. The noise amplitude in a certain pixel is typically higher for pixels with higher values. The illumination estimator 180 identifies illumination intensity in different segments/blocks of the frame and calculates the intensity factor for each segment.

The regional threshold calculating module 140 utilizes the intensity factor, together with the edge density factor(s) for the specific segment, and selects the corresponding foreground detection threshold for said segment of the frame. As indicated above, the foreground detection threshold may be selected to be equal to the edge density factor or a linear function thereof, e.g. edge density factor multiplied by the illumination factor.

Thus, the regional threshold calculating module 140 utilizes the edge density factor, and may also utilizes the illumination factor, to appropriately select the foreground detection threshold for each segment of the frame of the region of interest under processing. For example, the module 140 utilizes the edge density factor itself, or this factor multiplied by the illumination factor (as the case may be), to select a certain factor which is such that the higher the edge density factor (or its product with the illumination factor), the higher is the foreground detection sensitivity, and thus the lower is the selected foreground detection threshold.

Figure 4A:
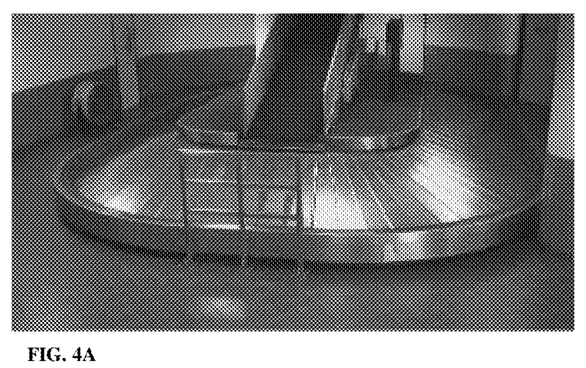
FIG. 4A shows a background model of a region of interest.
Figure 4B:
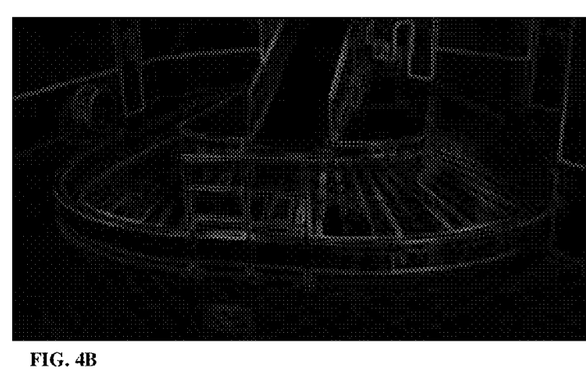
FIG. 4B shows a background gradient map.
Figure 4C:
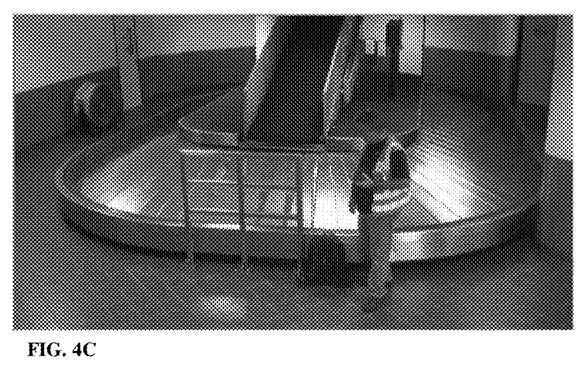
FIG. 4C shows a current image data to be processed.
Figure 4D:
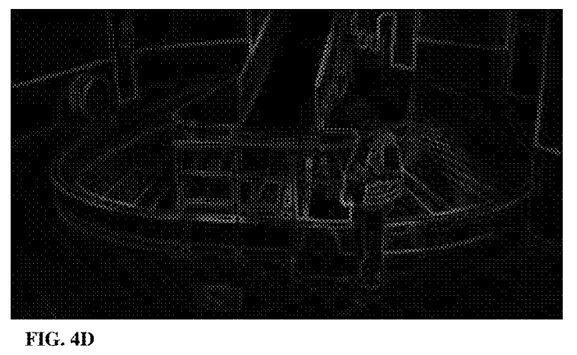
FIG. 4D shows image gradient maps.
Figure 4E:
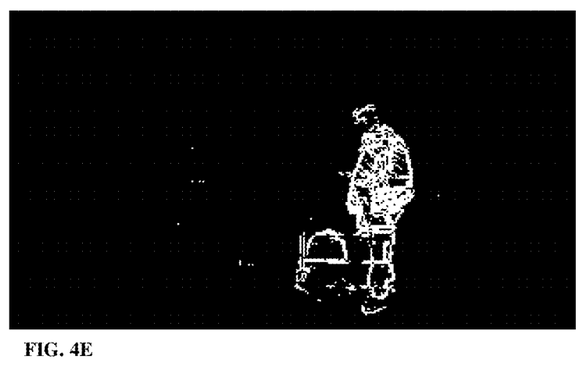
FIGS. 4E-4F show a difference between the gradient maps and division of the difference map to segments.
Figure 4F:
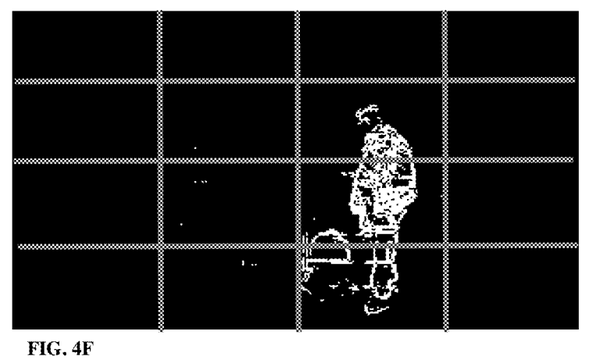
Figure 4G:
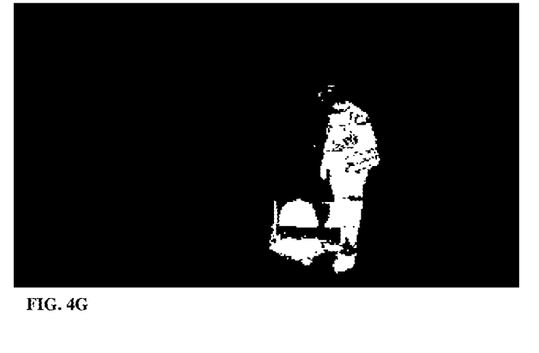
FIG. 4G shows the resulting foreground pixels identified by the technique of the present invention.

Reference is made to FIGS. 4A-4G exemplifying the technique of the present invention as utilized for detection of foreground objects in a region of interest. FIG. 4A illustrates a background model of the region; FIG. 4B shows a gradient map generated from the background model of FIG. 4A. The background model with or without the background gradient map may be generated by a background model generator, being a part of the processing system or not. Additionally, the background gradient map may be calculated by the edge detection nodule of the foreground extraction module of the present invention. FIG. 4C shows image data of the region of interest acquired by any suitable camera unit. Typically such camera unit is positioned at the region of interest and transmits image data to be processed. It should be noted that the background model of FIG. 4A may typically be calculated based on one or more images which were also acquired by the same camera unit. FIG. 4D shows an image gradient map and FIGS. 4E-4F show a binary difference map. The binary difference map assigns the value "1" to pixels where the difference between the image and background gradients exceeds a corresponding second threshold. To this end, the difference between the gradient maps of FIGS. 4B and 4D is calculated by the regional threshold calculating module and each pixel is assigned the value "1" if the difference exceed the second threshold or "0" if the difference is lower than the second threshold. In this non-limiting example the second threshold is selected to be 8. In FIG. 4F the difference gradient map divided into 16 segments for separate calculation of the corresponding foreground detection threshold. FIG. 4G shows the detected foreground pixels.

The regional threshold calculation module utilizes a segmented difference map as shown in FIG. 4F to calculate an appropriate foreground detection threshold as described above. The regional threshold calculation module counts the number of "white" pixels in each segment of the difference map, i.e. the pixels corresponding the gradient difference between the image and the background model, and determined an edge density factor for each segment. According to some embodiments, the foreground detection threshold is selected to be equal to the edge density factor, or a linear function thereof. In the present example the foreground detection threshold values were selected in the range of 16-48 in accordance with edge density factor in each segment and in accordance with equation 3 above where $EDF_{min}=8$ and $EDF_{max}=24$. The selected foreground detection threshold is then used in each segment to identify which pixels correspond to foreground of the image and which are background pixels as shown in FIG. 4G showing the foreground pixels in white. As shown in the present example the difference map describing differences in gradients between the background model and the image may typically be a binary map, however it should be understood that a gray-level map or complete difference map may also be used, and preferred at times. A gray-level difference map may be used to provide weights to pixels describing greater difference in the image gradient relative to the background.

Figure 5:
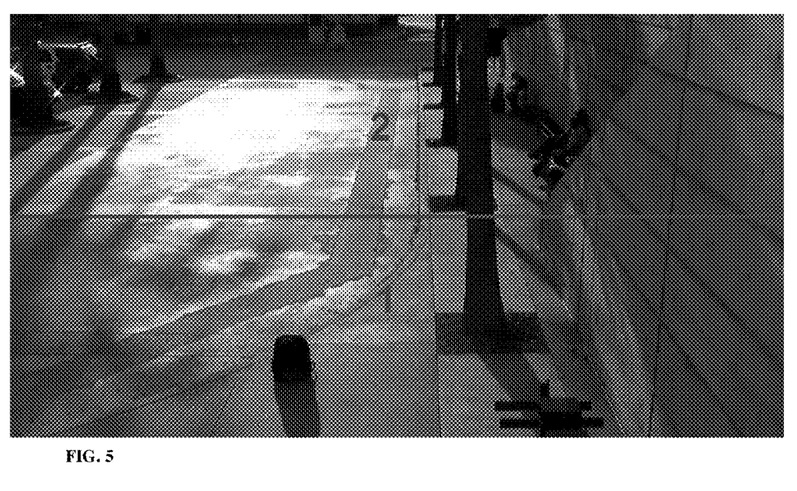
FIG. 5 illustrates segmentation of an image frame in accordance with distance of elements from the camera according to some embodiments of the invention.
Figure 6A:
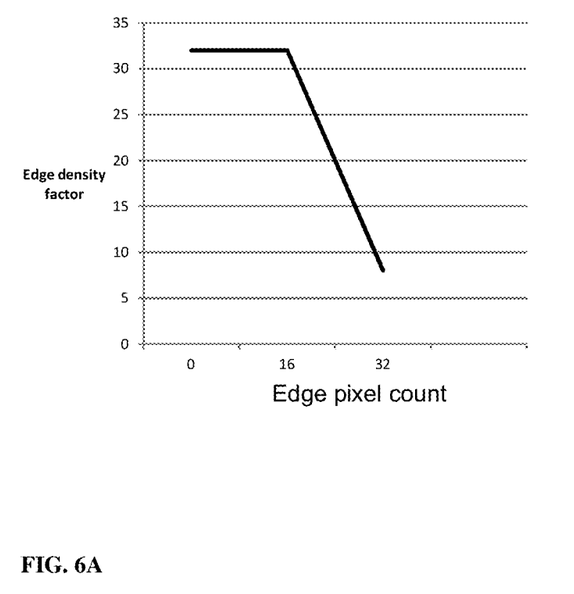
FIGS. 6A-6D exemplify variations of the edge density factor and illumination factor in accordance with distances of objects from the camera.
Figure 6B:
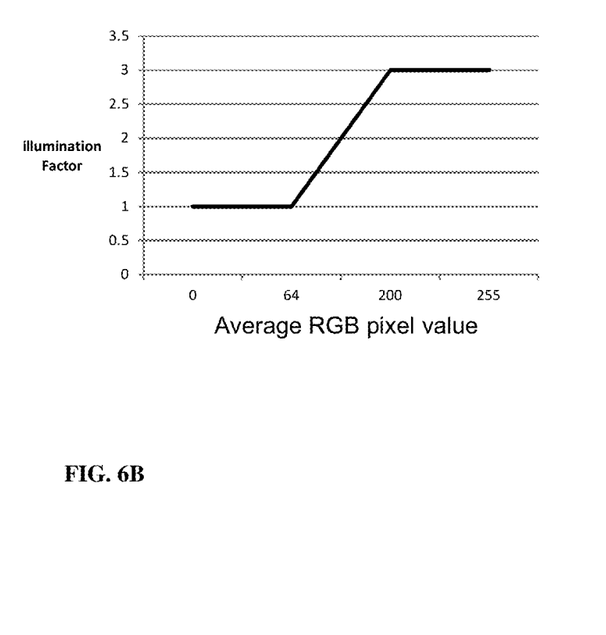
Figure 6C:
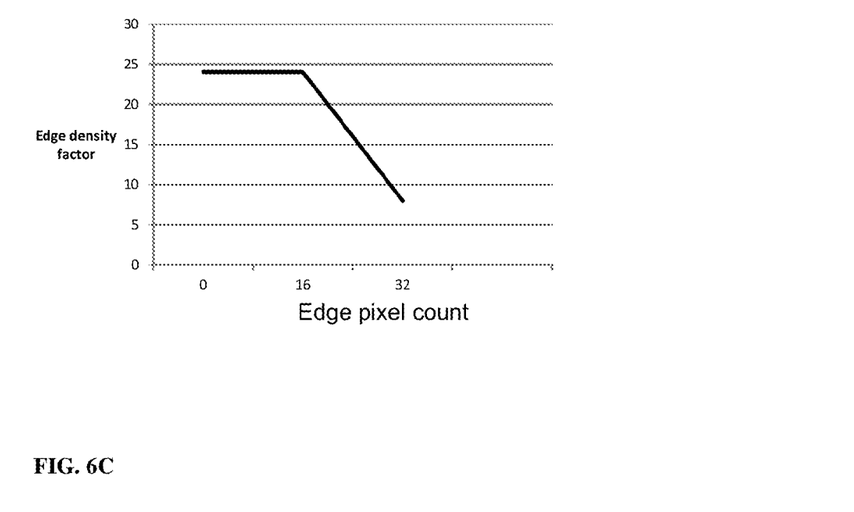
Figure 6D:
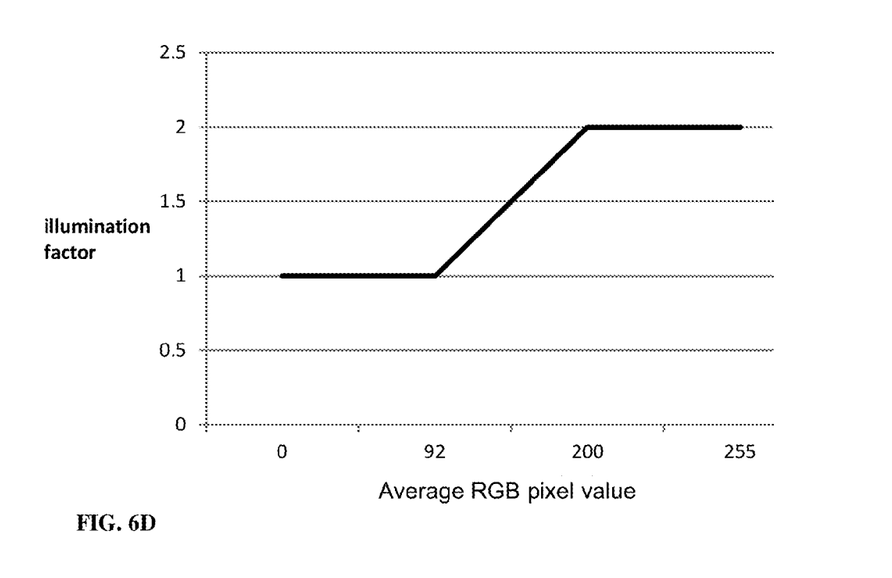

As indicated above, the technique of the present invention may also utilize pixel size data (pixel to meter ratio data) for selection of the foreground detection threshold. Reference is made to FIG. 5 illustrating an image of a region of interest and exemplifying variations in the pixel to meter ratio. The pixel size data, typically in the form of a ratio between pixels and the actual area these pixels represent in the region of interest, is often used in image processing systems to increase accuracy and efficiency of object detection and recognition. As shown above, with reference to FIG. 1, the video analysis system 200 may include a pixel size calculation unit 280 or may be connectable to an external size calculation unit. Such pixel size calculation unit may utilize raw or processed image data (e.g. a corresponding background model) to determine for each pixel in the image data (or in the background model) a size in the actual region of interest. The pixel size data may be calculated for individual pixels but is usually calculated for groups of pixels representing a segment (region) of the scene to provide more meaningful data. As shown in the example of FIG. 5, the image data is divided into two distance related segments including part 1 and part 2 of the image frame. In this non-limiting example the distance segments selection is chosen by selection of a pixel to meter threshold, e.g. in this example the parts of the frame corresponding to more than 100 pixels to meter are assigned to distance segment 1 and part of the frame where there are less than 100 pixels per meter are assigned to distance segment 2.

The regional threshold calculation module (140 in FIG. 2) may utilize this division of the frame to select appropriate foreground detection threshold values in accordance with the pixel size data (pixel to meter ratio). Typically the pixel size data is used to determine variations of the edge density factor and the illumination intensity factor which determined the final foreground detection threshold. This is exemplified in FIGS. 6A-6D showing edge density and illumination intensity factors variations with respect to distance segments 1 and 2 shown in FIG. 5. As shown in the figures, the values of $EDF_{min}$, $EDF_{max}$ and the values of the illumination factor may be selected for different distances in accordance with desired focus of the region of interest. In the present example, illustrated in FIG. 5, the system may be aimed at identifying objects which are relatively distant from the camera, and are located in distance segment 2. The edge density and illumination factors are therefore selected to be lower for distance segment 2 relative to distance segment 1 in order to provide higher sensitivity.

Thus the present invention provides a novel technique for use in foreground extraction processes. The technique utilizes background and image gradient maps for appropriate calculation of a foreground detection threshold which may later be used to classify pixels of the image as associated with the foreground or background. Those skilled in the art will readily appreciate that various modifications and changes can be applied to the embodiments of the invention as hereinbefore described without departing from its scope defined in and by the appended claims.

The invention claimed is:

1. A method for use in extraction of foreground objects in an image stream, the method comprising:
   providing input image data of a region of interest;
   providing a background model of said region of interest;
   providing data indicative of pixel to meter ratios in said input image data; and
   utilizing said background model and processing each image in said input image data, wherein said processing comprising:
      determining a background gradient map for pixels in said background model and an image gradient map for pixels in the image;
      determining one or more distance segments in said input image data using said data indicative of pixel to meter ratios and defining a predetermined number of one or more segments in said image and corresponding one or more segments in the background model such that pixels of said one or more segments correspond to one of said one or more distance segments; and for each image segment, determining an edge density factor being a first relation between the image and background gradient maps for said segment, and calculating a foreground detection threshold based on said certain relation, thereby enabling use of said foreground detection threshold for classifying each pixel in the segment as being a foreground or background pixel.

2. The method of claim 1, wherein determining said edge density factor comprises estimating a relative probability that said segment includes foreground objects.

3. The method of claim 1, comprising determining a second relation between values of the image pixels and values of corresponding pixels of said background model, in each image segment using the corresponding foreground detection threshold to classify the pixels in said image segment as foreground or background related pixels, such that if a second relation between values of said pixels is higher than said foreground detection threshold, the pixel is classified as being associated with a foreground object.

4. The method of claim 1, wherein said calculating of said foreground detection threshold comprising determining an illumination intensity factor being indicative of illumination intensity of said region of interest, said foreground detection threshold being determined in accordance with said intensity factor and the edge density factor.

5. The method of claim 4, wherein said determining of said illumination intensity factor comprises determining said illumination intensity factor in at least one segment of said of said region of interest.

6. The method of claim 1, comprising updating said background model in accordance with pixels of said image classified as associated with the background.

7. A system for use in extraction of foreground objects in an image stream, the system comprising:
   data input utility for receiving input image data of a region of interest, and data comprising a corresponding background model of said region of interest; and
   a data processing and analyzing utility configured and operable for receiving data indicative of pixel to meter ratios in said input image data, determining one or more distance segments in said input image data and defining a predetermined number of one or more segments such that pixels of said one or more segments correspond to one of said one or more distance segments, and further configured and operable for utilizing said background model for processing each image in said input image data,
   wherein said data processing and analyzing utility being further configured and operable for carrying out the following:
      calculating a background gradient map for pixels in said background model and an image gradient map for pixels in the image;
      utilizing said background and image gradient maps and generating an edge relation map and calculating a foreground detection threshold for at least one of said one or more segments of the region of interest in accordance with values of said relation map in said segment,
      calculating a relation between pixel values of the background model and of said image data in said at least one of said one or more segments, and if said relation exceeds said foreground detection threshold classifying the corresponding pixel as associated with foreground of said image data and generating output data indicative of foreground related pixels in said image data.

8. The system of claim 7, wherein said data processing and analyzing utility comprises an illumination estimator utility configured and operable for determining an illumination intensity factor being indicative of illumination intensity of said region of interest, said data processing and analyzing utility being configured and operable for utilizing said illumination intensity factor for calculating of said foreground detection threshold, said foreground detection threshold being determined in accordance with said intensity factor and the edge density factor.

9. The system of claim 8, wherein said illumination estimator utility determines said illumination intensity factor in at least one segment of said of said region of interest.

10. The system of claim 7, wherein said data processing and analyzing utility is configured and operable for providing data indicative of pixels of said image classified as associated with the background for updating said background model in accordance with said data.

11. A software product stored on a non-transitory computer readable medium for use in analyzing an image stream, the product comprising: a foreground extraction module configured and operable to receive input data comprising image data, a corresponding background model, and data indicative of pixel to meter ratio in said image data, and to process said image data using said background model,
   wherein said foreground extraction module comprising:
      an edge detection module configured to calculate a background gradient map for said background model and an image gradient map for said image data,
      a regional threshold calculation module configured to receive said background and image gradient maps and said data indicative of pixel to meter ratios, determining, in said image data, one or more distance segments to thereby calculate a foreground detection threshold for said at least one segment of the region of interest in accordance with pixel to meter ratios is said one or more distance segments, and further configured to generate an edge relation map for at least one segment of the region of interest in accordance with values of said relation map in said at least one segment, for use in detection of foreground related pixels in said image data.

12. The software product of claim 11, comprising a comparator module configured to calculate a relation between pixel values of the background model and of said image data in said at least one segment, and if said relation exceeds said foreground detection threshold classifying the corresponding pixel as associated with foreground of said image data.

13. The software product of claim 11, wherein the foreground extraction module comprising an illumination estimator module configured to determine an illumination intensity factor in accordance with illumination intensity of at least one of said background model and said image data, said regional threshold calculation module is configured to receive said background intensity factor and to adjust said foreground detection threshold accordingly.

14. The software product of claim 11, comprising a background updating module configured for receiving data about pixels of an image being associated with the background and for updating the background model.

* * * * *